(12) United States Patent
Ohmura et al.

(10) Patent No.: US 9,162,185 B2
(45) Date of Patent: Oct. 20, 2015

(54) ION-EXCHANGE MEMBRANE

(75) Inventors: Nobuhiko Ohmura, Shunan (JP); Kazuo Mizuguchi, Shunan (JP); Kazunori Nishio, Shunan (JP); Toshio Aritomi, Shunan (JP)

(73) Assignee: ASTOM Corporation, Tokyo (JP)

( * ) Notice: Subject to any disclaimer, the term of this patent is extended or adjusted under 35 U.S.C. 154(b) by 52 days.

(21) Appl. No.: 14/007,290

(22) PCT Filed: Mar. 28, 2012

(86) PCT No.: PCT/JP2012/058157
§ 371 (c)(1),
(2), (4) Date: Sep. 24, 2013

(87) PCT Pub. No.: WO2012/133538
PCT Pub. Date: Oct. 4, 2012

(65) Prior Publication Data
US 2014/0014519 A1 Jan. 16, 2014

(30) Foreign Application Priority Data
Mar. 29, 2011 (JP) ................................. 2011-072868

(51) Int. Cl.
| | |
|---|---|
| *B01D 61/48* | (2006.01) |
| *B01D 69/10* | (2006.01) |
| *B01D 71/28* | (2006.01) |
| *C08J 5/22* | (2006.01) |
| *B01J 39/20* | (2006.01) |
| *B01J 41/14* | (2006.01) |
| *B01J 47/00* | (2006.01) |
| *B01J 47/12* | (2006.01) |

(52) U.S. Cl.
CPC .............. *B01D 61/485* (2013.01); *B01D 69/10* (2013.01); *B01D 71/28* (2013.01); *B01J 39/20* (2013.01); *B01J 41/14* (2013.01); *B01J 47/007* (2013.01); *B01J 47/12* (2013.01); *C08J 5/22* (2013.01); *C08J 5/2231* (2013.01); *B01D 2325/42* (2013.01); *C08J 2323/06* (2013.01)

(58) Field of Classification Search
CPC .. B01D 61/485; B01D 2325/45; B01D 69/10; B01D 71/28; B01J 39/20; B01J 41/14; B01J 47/12; B01J 47/007; C08J 5/22

USPC ............................................. 521/27; 204/632
See application file for complete search history.

(56) References Cited

U.S. PATENT DOCUMENTS

| | | | |
|---|---|---|---|
| 4,311,752 A * | 1/1982 | Diedrich et al. ............... | 428/220 |
| 7,824,820 B2 | 11/2010 | Yamaguchi et al. | |
| 2005/0011826 A1* | 1/2005 | Childs et al. .................. | 210/490 |
| 2010/0279204 A1* | 11/2010 | Isomura et al. ............... | 429/498 |

FOREIGN PATENT DOCUMENTS

| | | |
|---|---|---|
| EP | 0 003 129 A1 | 7/1979 |
| EP | 0003129 A1 * | 10/1979 |
| EP | 2 226 875 A1 | 9/2010 |
| EP | 2226875 A1 * | 9/2010 |
| JP | 64-22932 A | 1/1989 |
| JP | 01022932 A * | 1/1989 |
| JP | 2-2863 A | 1/1990 |
| JP | 02002863 A * | 1/1990 |
| JP | 10-296839 A | 11/1998 |
| JP | 10296839 A * | 11/1998 |
| JP | 2007-80558 A | 3/2007 |
| JP | 2009-96923 A | 5/2009 |
| WO | 03/008078 A2 | 1/2003 |
| WO | WO 03008078 A2 * | 1/2003 |
| WO | WO 03/075386 A1 | 9/2003 |
| WO | WO 03075386 A1 * | 9/2003 |

OTHER PUBLICATIONS

Extended European Search Report issued Nov. 4, 2014, in European Patent Application No. 12764720.4.
International Search Report Issued in PCT/JP2012/058157, mailed on Apr. 24, 2012.
Japanese Office Action JP2011-072868 issued on Dec. 28, 2011.
Japanese Office Action JP2011-072868 issued on Sep. 26, 2011.

* cited by examiner

*Primary Examiner* — Michael M Bernshteyn
(74) *Attorney, Agent, or Firm* — Birch, Stewart, Kolasch & Birch, LLP (57) ABSTRACT

An ion-exchange membrane including a porous unstretched polyethylene sheet in which fine pores are piercing, the pores being filled with an ion-exchange resin.
The ion-exchange membrane exhibits excellent concentration property.

3 Claims, 4 Drawing Sheets

Fig. 1

SAMPLE FOR MEASURING TENSILE
ELONGATION (unit in mm)

Fig. 3

MEMBRANE RESISTANCE PER A UNIT THICKNESS (Ω·cm²/cm)

MEMBRANE RESISTANCE PER A UNIT THICKNESS AND BRINE CONCENTRATION
○ EXAMPLES 4 to 6
● COMPARATIVE EXAMPLE 4 to 6

Fig. 4

ION-EXCHANGE MEMBRANE

TECHNICAL FIELD

This invention relates to an ion-exchange membrane which includes, as a base material, a porous sheet in which fine pores are piercing.

BACKGROUND ART

Ion-exchange membranes have been industrially used in many fields as electrolytic membranes for conducting the electrodialysis in the step of desalting for producing salts and foods, in the fuel cells, and as membranes for diffusion dialysis for recovering acids from the acids that contain metal ions generated in the steel industries. The ion-exchange membranes have a structure in which a base sheet that serves as a reinforcing material is provided as a core material in the ion-exchange resin so as to impart a predetermined membrane strength and shape stability for the membranes. Without the core material, the ion-exchange membrane, due to its much ion-exchange groups, easily undergoes the swelling if it is dipped in an electrolytic aqueous solution, and loses the strength or is deformed.

There has heretofore been known an ion-exchange membrane using a porous resin sheet as the base sheet. In the ion-exchange membrane of this form, voids in the porous resin sheet which is the base material are filled with the ion-exchange resin offering an advantage of a small electric resistance of the membrane (hereinafter membrane resistance). As the porous resin sheet, there has, usually, been used a thin film of a polytetrafluoroethylene or a high molecular polyethylene resin, the thin film being stretched in a monoaxial direction or in biaxial directions to avoid a decrease in the strength caused by the porosity. For example, a patent document 1 discloses a cation-exchange membrane for producing salts that includes a porous stretched polyethylene sheet (HIPORE manufactured by Asahi Kasei Chemicals Co. or SETELA manufactured by Tonen-Kagaku-Nasu Co.) as the base sheet.

PRIOR ART DOCUMENT

Patent Document

Patent document 1: JP-A-2009-96923

OUTLINE OF THE INVENTION

Problems that the Invention is to Solve

The ion-exchange membrane using the above porous base sheet of a small thickness, however, does not have a practicable strength despite it has been stretched and, besides, cannot be said to offer high concentration property when the electric dialysis is carried out. The concentration property stands for a relationship between the membrane resistance of the ion-exchange membrane per a unit thickness thereof and the salt concentration (brine concentration) of the concentrated water that is formed by the electric dialysis by using the membrane. A membrane can be said to have a high concentration property when it has a small membrane resistance per the unit thickness and is capable obtaining the highly concentrated brine water.

It is, therefore, an object of the present invention to provide an ion-exchange membrane using a porous base sheet, that features further improved concentration property when the electric dialysis is carried out. Concretely, the invention provides an ion-exchange membrane that has a very small membrane resistance per a unit thickness and is capable of obtaining a high brine concentration.

Means for Solving the Problems

Through extensive experiments and study concerning the above problems, the present inventors have discovered a quite unexpected fact that improved concentration property can be achieved by using an unstretched porous polyethylene sheet as the porous base sheet as compared to when a stretched sheet is used, and have completed the invention.

According to the present invention, there is provided an ion-exchange membrane including a porous unstretched polyethylene sheet in which fine pores are piercing, the pores being filled with an ion-exchange resin.

In the ion-exchange membrane of the invention, it is desired that the porous unstretched polyethylene sheet has a thickness of 10 to 300 μm and a porosity of 30 to 80%.

Further, the ion-exchange resin is obtained by filling the pores with a polymerizable composition for forming the ion-exchange resin followed by the polymerization of the polymerizable composition.

In the invention, the porous unstretched polyethylene sheet used as the base sheet has not been stretched and, therefore, has a very large tensile elongation as compared to the stretched porous polyethylene sheet, i.e., has tensile elongations of not less than 450% in both the lengthwise direction (MD) and the axial direction (TD).

Effects of the Invention

The ion-exchange membrane of the present invention exhibits greatly improved concentration property as compared to the one that uses a porous stretched sheet as the base sheet.

For example, as demonstrated in Examples appearing later, if the membrane resistance per a unit length is denoted by A ($\Omega \cdot cm^2/cm$) and the brine concentration in the seawater concentration testing by B (mol/L), then the ion-exchange membrane (cation-exchange membrane or anion-exchange membrane) of the present invention satisfies the condition expressed by the following formula:

$$B > 0.006A + 1.7.$$

The above formula is obtained from the experimentally found values. This formula represents a relationship between the membrane resistance A per a unit thickness and the brine concentration B in the seawater concentration testing, and serves as a scale for indicating the effect of the invention. The greater the difference between the brine concentration B and the right side, the greater the effect. That is, the ion-exchange membrane of the present invention is capable of producing brine of a high concentration as compared to its membrane resistance, exhibits excellent concentration property, and is capable of obtaining a brine concentration higher than that of when there is used an ion-exchange membrane that uses a porous stretched sheet as the base sheet.

In the present invention, the seawater concentration testing stands for conducting the electric dialysis with a current density of 3 A/dm$^2$ by incorporating a cation-exchange membrane and an anion-exchange membrane in a small electric dialyzer (current flowing membrane area of 100 cm$^2$) and feeding the seawater into the desalting chamber at 25° C. The brine concentration is found from a Cl⁻ concentration of the concentrated solution obtained by the seawater concentration testing.

In the invention, further, use of the unstretched polyethylene sheet makes it easy to increase the thickness thereof to a considerable degree. As a result, the mechanical strength and the shape stability can be improved by adjusting the thickness. When arranged in a variety of electric dialyzer vessels, therefore, a change in the form caused by the swollen ion-exchange resin can be effectively suppressed and leakage of liquid can be effectively prevented, either. For example, when a stretched polyethylene sheet is used as the base sheet, there is a limit for adjusting the properties such as mechanical strength and the like by adjusting the thickness since the thickness of the sheet has already been decreased by the stretching. When the unstretched polyethylene sheet is used, however, there is no limitation in the thickness and there is a very large degree of freedom in adjusting the properties such as mechanical strength and the like.

MODES FOR CARRYING OUT THE INVENTION

<Structure of the Ion-Exchange Membrane>

As described above, the ion-exchange membrane of the present invention has the greatest feature on the use of an unstretched porous polyethylene sheet as the base sheet, having a structure in which fine pores piercing through the unstretched sheet from the front to the back thereof are filled with an ion-exchange resin.

In order to satisfy the properties such as ion-exchange capacity, membrane resistance, dimensional stability and mechanical strength, it is desired that the thickness and porosity of the unstretched porous polyethylene sheet are lying within predetermined ranges, such as the thickness lying in a range of 10 to 300 µm and, specifically, 50 to 250 µm and the porosity lying in a range of 30 to 80% and, specifically, 40 to 60%. If the thickness is too small, the mechanical strength decreases and if the thickness is unnecessary large, the electric resistance tends to increase. Further, if the porosity is unnecessarily large, the amount of the ion-exchange resin increases per a unit volume. When put to practical use, therefore, the dimensional stability decreases due to swelling and contraction of the ion-exchange resin, and the mechanical strength tends to decrease, too. On the other hand, if the porosity is too small, it becomes difficult to fill the voids in the unstretched porous polyethylene sheet with the ion-exchange resin and, besides, the amount of the ion-exchange resin becomes small per a unit volume. Therefore, the ion-exchange capacity is not exhibited to a sufficient degree and, as a result, the membrane resistance will increase.

Further, as the polyethylene that constitutes the porous unstretched sheet, there can be used any known polyethylenes such as linear low-density polyethylene, low-density polyethylene, intermediate-density polyethylene, high-density polyethylene or very high molecular weight polyethylene. Specifically, from the standpoint of concentration property, it is desired to use the high-density polyethylene, intermediate-density polyethylene, low-density polyethylene or linear low-density polyethylene. From the standpoint of mechanical properties such as membrane strength and shape stability, it is desired to use the very high molecular weight polyethylene. By using a blend of the above polyethylenes, further, it is allowed to adjust the concentration properties and mechanical properties. Further, these polyethylenes may be copolymers (linear copolymerized polyethylenes) containing an α-olefin unit such as propylene, butene, pentene, hexene or octene in an amount of not more than 4 mol % relative to the ethylene unit.

The ion-exchange resin filled in the pores in the porous unstretched polyethylene sheet may be the known one such as the one obtained by introducing the ion-exchange group that expresses the ion-exchangeability or, concretely, a cation-exchange group or an anion-exchange group into a hydrocarbon resin or a fluorine-contained resin.

As the hydrocarbon resin, there can be exemplified a styrene resin and an acrylic resin. As the fluorine-contained material, there can be exemplified a perfluorocarbon resin.

The ion-exchange group is a functional group that could become a negative or positive electric charge in an aqueous solution. As the cation-exchange group, there can be exemplified a sulfonic acid group, a carboxylic acid group or a phosphonic acid group. Usually, the sulfonic acid group which is a strong acid group is desired. As the anion-exchange group, there can be exemplified primary to tertiary amino groups, quaternary ammonium group, pyridyl group, imidazole group or quaternary pyridinium group. Usually, it is desired to use the quaternary ammonium group or the quaternary pyridinium group which is strongly basic.

The ion-exchange resin having the above ion-exchange group is present in the ion-exchange membrane in such an amount as to exhibit a suitable degree of ion-exchange capacity (e.g., about 1 to 3.5 meq/g of dry membrane) depending upon the porosity of the base sheet comprising the above-mentioned porous unstretched polyethylene sheet or upon the amount of the ion-exchange groups introduced into the ion-exchange resin.

<Preparation of the Ion-Exchange Membrane>

The ion-exchange membrane of the invention having the above-mentioned structure is prepared by preparing a porous unstretched polyethylene sheet, filling the voids (pores) in the unstretched sheet with a polymerizable composition for forming an ion-exchange resin to thereby prepare an ion-exchange membrane precursor and, thereafter, polymerizing the polymerizable composition in the ion-exchange membrane precursor and, further as required, introducing the ion-exchange groups into the polymer obtained by the step of polymerization.

1. Preparation of the Porous Unstretched Polyethylene Sheet.

The porous unstretched polyethylene sheet is prepared by using the above-mentioned polyethylene for forming the sheet. The porous unstretched polyethylene sheet is prepared by mixing thereto an additive for forming pores in the polyethylene to thereby prepare a composition for forming the sheet, extrusion-forming the composition for forming sheet into an unstretched sheet having a predetermined thickness and, thereafter, extracting the additive with an organic solvent or removing the additive by dissolving it with an acid or an alkali.

Any additive can be used for forming the pores without specific limitation provided it can be removed from the sheet by extracting it with an organic solvent or by dissolving it with an alkali.

As the additive that can be extracted with an organic solvent, a plasticizer can be representatively used, such as phthalic acid ester like dioctyl phthalate, diisononyl phthalate, diisodecyl phthalate or dibutyl phthalate; adipic acid ester like dioctyl adipate or diisononyl adipate; phosphoric acid ester like trioctyl phosphate; trimellitic acid ester like trioctyl trimellitate; and organic acid ester such as glycerine acid ester. In addition to the above, there can be used fluidized paraffin, solid wax, mineral oil, citric acid ester or epoxylated plant oil as an additive that can be extracted with an organic solvent. In the invention, the phthalic acid ester and, specifically, the dioctyl phthalate (DOP) is preferred.

As the additive that can be dissolved in an acid or an alkali, there can be exemplified inorganic powders and, concretely, silica, alumina, mica and talc. Among them, silica is specifically preferred.

In the invention, the above-mentioned plasticizers and inorganic powders can be used in a single kind, respectively, or in a combination of two or more kinds. Specifically preferably, the plasticizer and the inorganic powder are used in combination. That is, the plasticizer is compatible with the polyethylene or disperses therein in a form being almost compatible therewith, and is advantageous specifically for forming pores so as to pierce through the polyethylene sheet while the inorganic powder is advantageous for forming pores of suitable sizes. By using the two in combination, therefore, it is allowed to easily adjust the size of pores piercing through the polyethylene sheet and the porosity to lie within the above-mentioned ranges. In the invention, for example, the plasticizer is used in an amount of 50 to 300 parts by weight and, specifically, 100 to 200 parts by weight per 100 parts by weight of the polyethylene. The inorganic powder is added together with the plasticizer to the polyethylene in an amount of 30 to 150 parts by weight and, specifically, 50 to 100 parts by weight per 100 parts by weight of the polyethylene.

As described above, the plasticizer is removed from the polyethylene sheet by being extracted with an organic solvent while the inorganic powder is removed by being dissolved in an acid or an alkali. When the plasticizer and the inorganic powder are added to the polyethylene sheet, it is desired that the plasticizer is removed first and, thereafter, the inorganic powder is removed. That is, fine pores are formed by the removal of the plasticizer followed by the treatment with an acid or an alkali. Therefore, the acid or the alkali permeates into the polyethylene sheet passing through the pores. As a result, the inorganic powder dispersed therein dissolves and is quickly removed.

The porous polyethylene sheet prepared as described above has not been stretched and, as described already, has a very large tensile elongation as compared to the one that is stretched, and has both MD and TD tensile elongations of not less than 450%. Here, the MD stands for the mechanical direction (take-up direction) in which the composition for forming the sheet is extrusion-formed, and the TD stands for a direction perpendicular to the MD.

2. Preparation of the Polymerizable Composition.

The polymerizable composition to be filled in the voids in the porous unstretched polyethylene sheet prepared as described above, contains a monomer having a functional group (functional group for introducing exchange group) that is capable of introducing the ion-exchange groups or a monomer having an ion-exchange group (hereinafter, these monomers are often called "basic monomer components"), a crosslinking monomer and a polymerization initiator, and is prepared by mixing these components together.

The monomer having a functional group for introducing exchange group and the monomer having an ion-exchange group may be those that have heretofore been used for producing the ion-exchange resins.

As the monomer having a functional group for introducing cation-exchange group, for example, there can be exemplified styrene, chloromethylstyrene, vinyltoluene, vinylxylene, α-methylstyrene, vinylnaphthalene and α-halogenated stylene.

As the monomer having a functional group for introducing anion-exchange group, there can be exemplified stylene, vinyltoluene, chloromethylstyrene, vinylpyridine, vinylimidazole, α-methylstyrene and vinylnaphthalene.

As the monomer having the cation-exchange group, there can be exemplified sulfonic acid type monomers such as α-halogenated vinylsulfonic acid, stylenesulfonic acid and vinylsulfonic acid; carboxylic acid type monomers such as methacrylic acid, acrylic acid and anhydrous maleic acid; phosphonic acid type monomers such as vinylphosphoric acid; and salts thereof.

As the monomer having the anion-exchange group, there can be exemplified amine type monomers such as vinylbenzyltrimethylamine and vinylbenzyltriethylamine; nitrogen-containing heterocyclic monomers such as vinylpyridine and vinylimidazole; and salts thereof.

When the monomer having the ion-exchange group is used as the above monomer, the desired ion-exchange membrane is obtained in a stage after the step of polymerization is finished as will be described later. When the monomer having the functional group for introducing ion-exchange group is used, the desired ion-exchange membrane is obtained by conducting the step of introducing the ion-exchange group after the step of polymerization.

The crosslinking monomer is used for increasing the density of the ion-exchange resin, for suppressing the swelling and for increasing the membrane strength. As the crosslinking monomer, though there is no specific limitation, there can be exemplified divinyl compounds such as divinylbenzene, divinylsulfone, butadiene, chloroprene, divinylbiphenyl, trivinylbenzenes, divinylnaphthalene, diallylamine, divinylpyridine, 1,2-bis(vinylphenyl)ethane, ethylene glycol dimethacrylate and N,N-methylenebisacrylamide.

These crosslinking monomers are, usually, used in an amount of preferably 0.1 to 50 parts by weight and, more preferably, 1 to 40 parts by weight per 100 parts by weight of the above-mentioned basic monomer components.

In addition to the above-mentioned monomer having the functional group for introducing exchange group, monomer having the ion-exchange group and crosslinking monomer, there may be further added, as required, other monomers copolymerizable with the above monomers. As the other monomers, there can be used, for example, styrene, acrylonitrile, methylstyrene, acrolein, methyl vinyl ketone and vinylbiphenyl.

As the polymerization initiator, there can be used any known ones without specific limitation. Concretely, there can be used organic peroxide type polymerization initiators such as octanoyl peroxide, lauroyl peroxide, t-butylperoxy-2-ethyl hexanoate, benzoyl peroxide, t-butylperoxy isobutylate, t-butylperoxylaurate, t-hexylperoxy benzoate and di-t-butylperoxide, as well as azo type polymerization initiators such as azobisisobutylonitrile.

The polymerization initiator is contained in an amount of, desirably, 0.1 to 20 parts by weight and, more preferably, 0.5 to 10 parts by weight per 100 parts by weight of the basic monomer components.

The polymerizable composition that contains the above various components can, as required, be further blended with a matrix resin to adjust the viscosity.

As the matrix resin, there can be used a saturated aliphatic hydrocarbon polymer such as ethylene-propylene copolymer or polybutylene, a styrene type polymer such as styrene-butadiene copolymer, a nitril-butadiene rubber, a hydrogenated nitril-butadiene rubber, an epichlorohydrin rubber, a polyvinylchloride, a chlorinated polyethylene rubber, or those obtained by copolymerizing them with a variety of kinds of comonomers (e.g., styrene type monomers such as vinyltoluene, vinylxylene, chlorostyrene, chloromethylstyrene, $\alpha$-methylstyrene, $\alpha$-halogenated styrene or $\alpha,\beta$, $\beta'$-trihalogenated styrene, monoolefins such as ethylene or butylene, or conjugated diolefins such as butadiene or isoprene). These matrix resins are used in such amounts that impart viscosity with which the polymerizable composition can be quickly filled in the voids in the porous unstretched polyethylene sheet without causing the polymerizable composition to be dripped.

Further, the polymerizable composition can, as required, be blended with a plasticizer in order to impart flexibility to the membrane after polymerized or to facilitate the introduction of the exchange groups. As the plasticizer, there can be used phthalic acid esters such as dioctyl phthalate and dibutyl phthalate; adipic acid esters such as dioctyl adipate and diisononyl adipate; epoxies such as styrene oxide; and ethers such as diphenyl ether and dibenzyl ether.

3. Preparation of the Ion-Exchange Membrane Precursor.

The above polymerizable composition is filled in the voids in the porous unstretched polyethylene sheet to thereby obtain an ion-exchange membrane precursor of which the voids are filled with the polymerizable composition.

In the invention, the polymerizable composition is polymerized being filled in the voids in the unstretched polyethylene sheet. Therefore, the ion-exchange resin obtained by polymerization adheres very highly closely to the polyethylene sheet that is the base sheet. The present inventors, therefore, consider that when the electric dialysis is conducted by using the ion-exchange membrane, improved concentration property is realized. That is, in the unstretched polyethylene sheet, the polyethylene molecules have not been oriented but are arranged in a random fashion permitting monomer molecules to easily infiltrate into gaps among the molecules. Therefore, the affinity is high between the monomers and the surface of the porous unstretched polyethylene sheet, and highly close adhesion is attained between the polymer (ion-exchange resin) that is formed and the porous unstretched polyethylene sheet that is the base sheet. Since highly close adhesion is thus maintained between the ion-exchange resin and the base sheet (porous unstretched polyethylene sheet), the electric dialysis that is conducted by using the ion-exchange membrane permits ions of a predetermined polarity to pass through (anions in the case of the anion-exchange membrane, cations in the case of the cation-exchange membrane) while effectively suppressing the passage of water molecules or other ions (almost no void is present between the ion-exchange resin and the base sheet), and improved concentration property is obtained.

On the other hand, the conventional ion-exchange membranes are using a stretched resin sheet as the porous base sheet and, therefore, close adhesion is not maintained between the ion-exchange resin and the base sheet. Since the adhesion is not sufficient, high concentration property is not obtained. That is, in the porous stretched resin sheet, the resin molecules have been oriented regularly. Therefore, the monomer molecules little infiltrate into gaps among the molecules, affinity is poor between the ion-exchange resin that is obtained and the porous stretched resin sheet that is the base sheet, and adhesion is very small between the two. As a result, when the electric dialysis is conducted by using the ion-exchange membrane, ions of a predetermined polarity pass through together with water molecules and other ions, and the concentration property becomes low.

In the invention, there is no specific limitation on the method of filling the voids in the porous unstretched polyethylene sheet with the polymerizable composition. Usually, however, there is employed a method of dipping the porous unstretched polyethylene sheet in the polymerizable composition or a method of applying or spraying the polymerizable composition onto the porous unstretched polyethylene sheet. Here, if it is difficult to fill the voids in the porous unstretched polyethylene sheet with the polymerizable composition to a sufficient degree due to properties such as viscosity, then there may be employed a method of filling by bringing the polymerizable composition into contact with the porous unstretched polyethylene sheet under a reduced pressure.

4. Polymerizing the Polymerizable Composition.

The ion-exchange membrane precursor is obtained by filling the voids in the porous unstretched polyethylene sheet with the polymerizable composition as described above, and is then put to the step of polymerization. When the monomer having the ion-exchange group is used as the base monomer component, the desired ion-exchange membrane is obtained through the completion of this step. When the monomer having the functional group for introducing exchange group is used, the ion-exchange groups must be introduced after the completion of the above step.

As for the method of polymerization after the voids in the porous unstretched polyethylene sheet have been filled with the polymerizable composition, it is, usually, desired to elevate the temperature starting from the normal temperature under a pressurized condition with the polymerizable composition being sandwiched between the polyester films. The polymerization conditions may vary depending on the kind of the polymerization initiator and the kinds of the monomers, and may be suitably selected and determined in compliance with the known conditions.

Though the polymerization can be conducted even at a temperature higher than the melting point of the unstretched polyethylene sheet, the strength of the obtained ion-exchange membrane may often decrease. Therefore, the polymerization is conducted at a temperature near or lower than the melting point of the unstretched polyethylene sheet. Usually, a temperature range of 40 to 140° C. is preferred. Namely, upon conducting the polymerization by being heated in such a temperature range, the polymerization undergoes in a state where the unstretched polyethylene sheet is partly dissolved in the polymerizable composition. As a result, the junction strength increases between the unstretched polyethylene sheet and the ion-exchange resin, and the membrane strength is further improved.

The polymerization can be conducted in the air. However, the polymerization could often be impaired with the oxygen in the air. It is, therefore, desired that the polymerization is conducted in the nitrogen atmosphere. The polymerization time is, usually, from about 30 minutes to about 24 hours though it may differ depending on the temperature of polymerization and the like.

5. Introducing the Ion-Exchange Groups.

When the monomer having the ion-exchange group is used as the basic monomer component in the polymerizable composition as described above, the ion-exchange resin is formed through the above-mentioned step of polymerization and the desired ion-exchange membrane is obtained in this stage. When the monomer having the functional group for introducing exchange group is used as the basic monomer component, however, the resin obtained through the step of polymerization has no ion-exchange group and, therefore, the ion-exchange group must be introduced after the step of polymerization.

The ion-exchange groups are introduced by a known method. When the cation-exchange membrane is to be produced, for example, the ion-exchange groups are introduced through the treatment of sulfonation, chlorosulfonation, phosphoniation or hydrolysis. When the anion-exchange membrane is to be produced, the ion-exchange groups are introduced through amination or alkylation.

The ion-exchange membrane produced as described above features highly close adhesiveness between the ion-exchange resin and the base sheet (porous unstretched polyethylene sheet) as described already since the base sheet has not been stretched and, therefore, exhibits high concentration property.

EXAMPLES

The invention will now be described in further detail by way of Examples to which only, however, the invention is in no way limited.

Properties of the base sheet and ion-exchange membranes in Examples and Comparative Examples were measured by the methods described below.

Thickness of the Porous Polyethylene Sheet.

Measured by using a very-small-thickness measuring instrument (type: KEN, terminal diameter: φ5 mm, measuring pressure: 62.47 kPa) manufactured by Toyo Seiki Co. at an atmospheric temperature of 23±2° C.

Porosity.

A square sample measuring 100 mm×100 mm was cut from a fine porous membrane, its volume ($mm^3$) and mass (mg) were found, and from them and from its membrane density ($g/cm^3$), the porosity was calculated by using the following formula, Porosity(%)=(volume−mass/membrane density)/volume×100

The volume was calculated from the size of the sample and the membrane thickness. The membrane density was calculated from the density of the material.

Air Permeability.

Measured in compliance with the JIS P-8117 by using the Gurley type air-permeability tester (G-B2 (trademark) manufactured by Toyo Seiki Co.).

Tensile Elongation.

Figure 1:
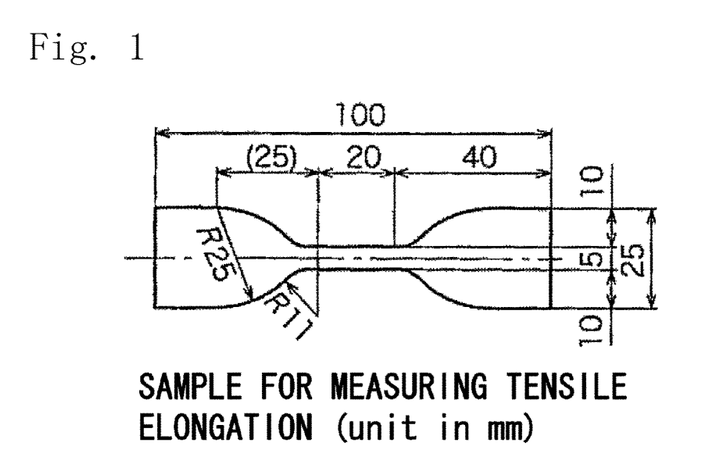
FIG. 1 is a view showing a sample used for measuring the tensile elongation in Examples.

MD and TD samples (FIG. 1) were measured for their tensile elongations in compliance with the JIS K7127 by using a tension tester (Tensilon universal tester RTG-1210 (trademark) manufactured by Orientech Co.). The gap between the chucks was set to be 50 mm. A contact-type extensometer was mounted between the indicators, the amount of elongation (mm) was measured until the sample was broken, the amount of elongation (mm) until the sample was broken was divided by the distance (20 mm) between the indicators, was multiplied by 100, and was regarded to be the tensile elongation (%). The measurement was taken under the conditions of a temperature of 23±2° C., a chuck pressure of 0.50 MPa and a tension speed of 100 mm/min.

Viscosity Average Molecular Weight.

A limiting viscosity [η] was found in a decalin solution at 135° C. in compliance with the ASTM-D4020. The viscosity average molecular weight (Mv) of the polyethylene was calculated according to the following formula, In the case of the polyethylene, $$[\eta]=6.77\times10^{-4}\times M_v^{0.67}$$

Membrane Resistance.

The ion-exchange membrane was held in a two-chamber cell having platinum black electrodes, the 2-chamber cell was filled with a 0.5 mol/L-NaCl solution on both sides of the ion-exchange membrane, and the resistance across the electrodes was measured 25° C. by using an AC bridge (frequency of 1000 cycles/sec). The membrane resistance was found from a difference between the above resistance across the electrodes and the resistance across the electrodes of when no ion-exchange membrane was installed. The ion-exchange membrane used for the above measurement was the one that had been equilibrated in advance in a 0.5 mol/L-NaCl solution.

Thickness of the Ion-Exchange Membrane.

After dipped in the 0.5 mol/L-NaCl solution, the surface of the membrane was wiped with a tissue paper and was measured by using the micrometer MED-25PJ (manufactured by Mitsutoyo Co.).

Membrane Resistance Per a Unit Thickness.

Calculated in compliance with the following formula.

Membrane resistance per a unit thickness($\Omega \cdot cm^2/cm$)
=membrane resistance($\Omega \cdot cm^2$)/membrane thickness(cm)

Brine Concentration.

The cation-exchange membranes shown in Examples and in Comparative Examples were incorporated in small electric dialyzers (current flowing membrane area of 100 $cm^2$) in pairs with the anion-exchange membrane ACS (manufactured by Astom Co.) for producing salt while the anion-exchange membranes shown in Examples and Comparative Examples were incorporated in the small electric dialyzers (current flowing membrane area of 100 $cm^2$) in pairs with the cation-exchange membrane SIMS (manufactured by Astom Co.) for producing salt, and the seawater concentration test was conducted. The concentration conditions consisted of a flow rate of 6 cm/sec in the desalting chamber, an electric current density of 3 A/$dm^2$ and feeding the seawater at 25° C. The $Cl^{-1}$ concentration of the obtained concentrated solution was regarded to be a brine concentration.

<Preparation of the Porous Unstretched Polyethylene Sheet>

Preparation Example 1

19.2 Parts by weight of a ultra high molecular weight polyethylene having a viscosity average molecular weight of 1,000,000, 12.8 parts by weight of a high-density polyethylene having a viscosity average molecular weight of 250,000, 48 parts by weight of a dioctyl phthalate (DOP) and 20 parts by weight of a fine silica powder were mixed together and granulated, melt-kneaded in a biaxial extruder equipped with a T-die at an end thereof, rolled from both sides with heated rolls, and were formed into a sheet of a thickness of 110 μm.

The DOP and fine powdery silica were extracted and removed from the formed product thereof to prepare a porous unstretched polyethylene sheet.

The porous unstretched polyethylene sheet possessed the following properties.
Thickness; 90 μm
Porosity; 50%
Air permeability; 1,150 sec/100 cc
Tensile elongations; MD 590%, TD 941%

<Preparation of the Porous Stretched Polyethylene Sheet>

Preparation Example 2

The porous unstretched polyethylene sheet obtained in Preparation Example 1 was monoaxially stretched in TD into 2.5 times at 120° C. and at a stretching ratio of 10%/sec.

The porous stretched polyethylene sheet possessed the following properties.
Thickness; 34 μm
Porosity; 49%
Air permeability; 96 sec/100 cc
Tensile elongations; MD 537%, TD 255%

Example 1

82.5 parts by weight of a styrene, 17.5 parts by weight of a divinylbenzene (purity of 57%), 5 parts by weight of a dibutyl phthalate and 2 parts by weight of a perbutyl O (t-butylperoxy-2-ethyl hexanoate, manufactured by Nihon Yushi Co.) were mixed together to prepare a polymerizable composition.

500 Grams of the polymerizable composition was put into a 1000-ml glass container and in which the porous unstretched polyethylene sheet prepared in the Preparation Example 1 was dipped as the base sheet so that the pores in the sheet was filled with the polymerizable composition.

The porous unstretched polyethylene sheet filled with the polymerizable composition was taken out, covered on both sides thereof with a polyester film of a thickness of 100 μm as a peeling member, and was heat-polymerized under a nitrogen pressure of 0.4 MPa for 5 hours at 80° C. and for another 2 hours at 90° C.

The obtained membrane was dipped in a mixture of sulfuric acid of a concentration of 98% and chlorosulfonic acid of a purity of not lower than 90% at a ratio of 1:1 (weight ratio) at 40° C. for 60 minutes. Thereafter, the membrane was successively dipped in 90% sulfuric acid, 60% sulfuric acid and ion-exchanged water and was, further, dipped in a 4 mol/L-NaOH aqueous solution for 12 hours followed by washing with water to obtain a sulfonic acid type cation-exchange membrane.

The obtained cation-exchange membrane possessed an electric resistance of 1.16 Ω·cm$^2$, a thickness of 107 μm and a brine concentration of 3.22 mol/L.

Comparative Example 1

A cation-exchange membrane was obtained in quite the same manner as in Example 1 but using the porous stretched polyethylene sheet obtained in Preparation Example 2 as the base sheet. Properties of the obtained cation-exchange membrane and the measured results thereof were as shown in Table 1.

Examples 2 and 3

Cation-exchange membranes were obtained in the same manner as in Example 1 but using the porous unstretched polyethylene sheet obtained in Preparation Example 1 and using the styrene and the DVB (purity of 57%) in amounts as shown in Table 1. Properties of the obtained cation-exchange membrane and the measured results thereof were as shown in Table 1.

Comparative Examples 2 and 3

Figure 2:
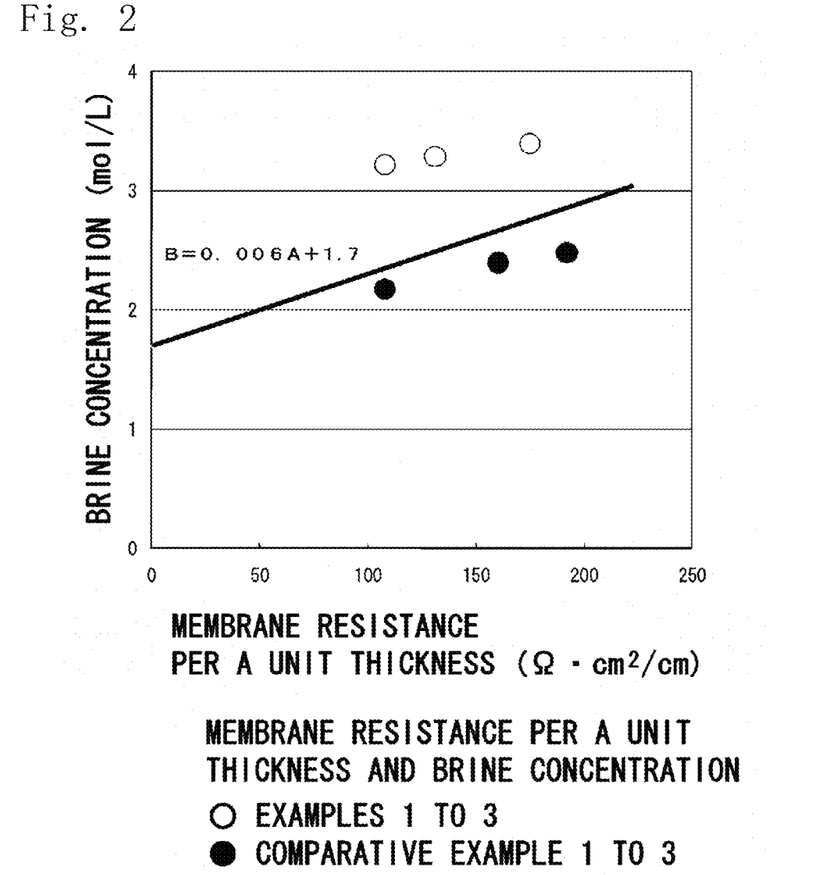
FIG. 2 is a diagram showing relationships between the membrane resistance per a unit thickness and the brine concentration by using the ion-exchange membranes of Examples 1 to 3 and Comparative Examples 1 to 3.

Cation-exchange membranes were obtained in quite the same manner as in Examples 2 and 3 but using the porous stretched polyethylene sheet obtained in Preparation Example 2 as the base sheet. Properties of the obtained cation-exchange membranes and the measured results thereof were as shown in Table 1. FIG. 2 shows relationships between the brine concentrations and the membrane resistances per a unit thickness of the cation-exchange membranes obtained in Examples 1 to 3 and in Comparative Examples 1 to 3.

TABLE 1

| | Base sheet | Composition (weight ratio) | | | | Membrane thickness (μm) | Membrane resistance (Ω·cm$^2$) | Membrane resistance per unit membrane thickness (Ω·cm$^2$/cm) | Brine concentration (mol/L) |
| | | St | DVB | DBP | PO | | | | |
|---|---|---|---|---|---|---|---|---|---|
| Ex. 1 | unstretched | 82.5 | 17.5 | 5 | 2 | 107 | 1.16 | 108 | 3.22 |
| Ex. 2 | unstretched | 77.2 | 22.8 | 5 | 2 | 105 | 1.38 | 131 | 3.29 |
| Ex. 3 | unstretched | 73.7 | 26.3 | 5 | 2 | 105 | 1.84 | 175 | 3.40 |
| Comp. Ex. 1 | stretched | 82.5 | 17.5 | 5 | 2 | 37 | 0.40 | 108 | 2.18 |
| Comp. Ex. 2 | stretched | 77.2 | 22.8 | 5 | 2 | 35 | 0.56 | 160 | 2.40 |
| Comp. Ex. 3 | stretched | 73.7 | 26.3 | 5 | 2 | 36 | 0.69 | 192 | 2.48 |

St: styrene
DVB: divinylbenzene (57%)
DBP: dibutyl phthalate
PO: t-butylperoxyethyl hexanoate Example 4

89.5 parts by weight of a chloromethylstyrene, 10.5 parts by weight of a divinylbenzene (purity of 57%), 2 parts by weight of a styrene oxide and 4 parts by weight of a perbutyl O were mixed together to prepare a polymerizable composition.

Figure 3:
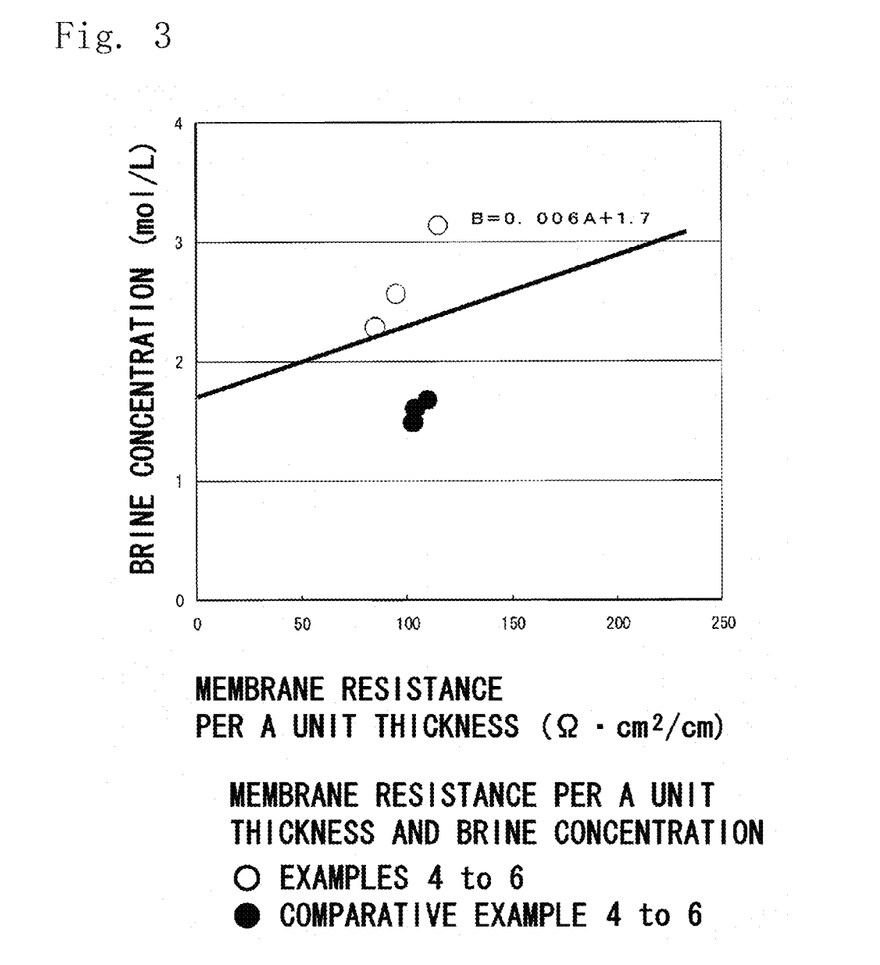
FIG. 3 is a diagram showing relationships between the membrane resistance per the unit thickness and the brine concentration by using the ion-exchange membranes of Examples 4 to 6 and Comparative Examples 4 to 6.

500 Grams of the polymerizable composition was put into a 1000-ml glass container and in which the porous unstretched polyethylene sheet prepared in the Preparation Example 1 was dipped as the base sheet so that, the pores in the sheet were filled with the polymerizable composition.

exchange membranes and the measured results thereof were as shown in Table 2. FIG. 3 shows relationships between the brine concentrations and the membrane resistances per a unit thickness of the anion-exchange membranes obtained in Examples 4 to 6 and in Comparative Examples 4 to 6.

TABLE 2

| | Base sheet | Composition (weight ratio) | | | | Membrane thickness (μm) | Membrane resistance ($\Omega \cdot cm^2$) | Membrane resistance per unit membrane thickness ($\Omega \cdot cm^2/cm$) | Brine concentration (mols/L) |
| --- | --- | --- | --- | --- | --- | --- | --- | --- | --- |
| | | St | DVB | StO | PO | | | | |
| Ex. 4 | unstretched | 89.5 | 10.5 | 2 | 4 | 103.5 | 0.88 | 85 | 2.29 |
| Ex. 5 | unstretched | 87.7 | 12.3 | 2 | 4 | 108 | 1.03 | 95 | 2.57 |
| Ex. 6 | unstretched | 86.0 | 14.0 | 2 | 4 | 105 | 1.21 | 115 | 3.14 |
| Comp. Ex. 4 | stretched | 89.5 | 10.5 | 2 | 4 | 42.5 | 0.436 | 103 | 1.49 |
| Comp. Ex. 5 | stretched | 87.7 | 12.3 | 2 | 4 | 40 | 0.414 | 104 | 1.61 |
| Comp. Ex. 6 | stretched | 86.0 | 14.0 | 2 | 4 | 41 | 0.449 | 110 | 1.68 |

CMS: chloromethylstyrene
DVB: divinylbenzene (57%)
StO: styrene oxide
PO: t-butylperoxyethyl hexanoate The porous unstretched polyethylene sheet filled with the polymerizable composition was taken out, covered on both sides thereof with a 100-μm polyester film as a peeling member, and was heat-polymerized under a nitrogen pressure of 0.4 MPa for 5 hours at 80° C. and for another 2 hours at 90° C.

The obtained membrane was dipped in a mixture of 15 parts by weight of a 30% trimethylamine aqueous solution, 52.5 parts by weight of water and 22.5 parts by weight of acetone at 30° C. for 16 hours to obtain a quaternary ammonium type anion-exchange membrane.

The obtained anion-exchange membrane possessed a resistance of 0.88 $\Omega \cdot cm^2$, a membrane thickness of 103.5 μm and a brine concentration of 2.29 mol/L. Table 2 shows the results of the membrane properties.

Comparative Example 4

An anion-exchange membrane was obtained in quite the same manner as in Example 4 but using the porous stretched polyethylene sheet obtained in Preparation Example 2 as the base sheet. Properties of the obtained anion-exchange membrane and the measured results thereof were as shown in Table 2.

Examples 5 and 6

Anion-exchange membranes were obtained in the same manner as in Example 4 but using the porous unstretched polyethylene sheet obtained in Preparation Example 1 and using the chloromethylstyrene and the DVB (purity of 57%) in amounts as shown in Table 2. Properties of the obtained anion exchange membranes and the measured results thereof were as shown in Table 2.

Comparative Examples 5 and 6

Anion-exchange membranes were obtained in quite the same manner as in Examples 5 and 6 but using the porous stretched polyethylene sheet obtained in Preparation Example 2 as the base sheet. Properties of the obtained anion- Comparative Example 7

A porous stretched polyethylene sheet having properties as described below was obtained in the same manner as in Preparation Example 2 but changing the stretching conditions.
Thickness; 56 μm
Porosity; 62%
Air permeability; 116 sec/100 cc
Tensile elongation; MD 94%, TD 338%

Next, 82.5 parts by weight of a styrene, 17.5 parts by weight of a divinylbenzene (purity of 57%), 2 parts by weight of a styrene oxide and 4 parts by weight of a perbutyl O (t-butylperoxy-2-ethyl hexanoate, manufactured by Nihon Yushi Co.) were mixed together to prepare a polymerizable composition.

An anion-exchange membrane was obtained in the same manner as in Example 4 but using the above polymerizable composition and the above porous stretched polyethylene sheet.

The obtained anion-exchange membrane possessed an electric resistance of 0.59 $\Omega \cdot cm^2$, a thickness of 66 μm and a brine concentration of 1.79 mol/L.

Figure 4:
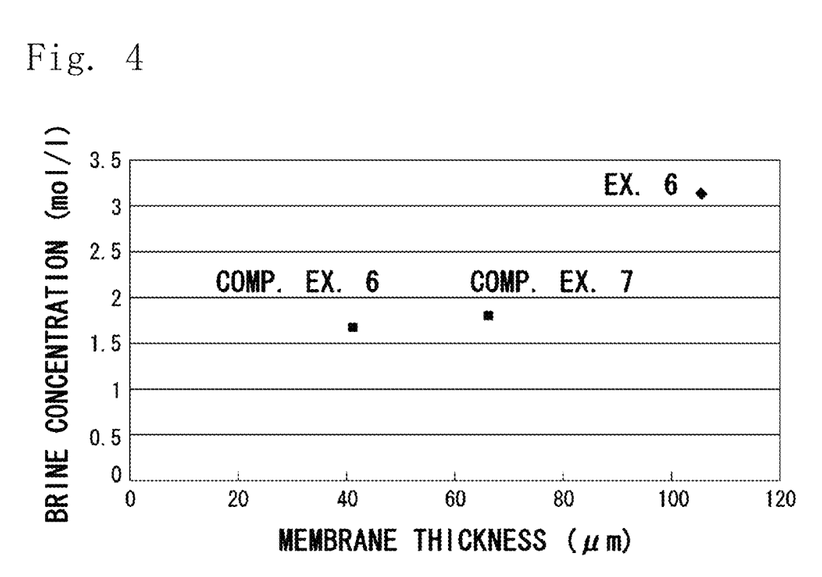
FIG. 4 is a diagram showing relationships between the thickness of the membrane and the brine concentration by using the ion-exchange membranes prepared in Example 6 and in Comparative Examples 6 and 7.

FIG. 4 shows relationships between the thicknesses and the brine concentrations of the anion-exchange membranes obtained in Comparative Examples 7, in Example 6 of which the membrane composition was close to that of Comparative Example 7 and in Comparative Example 6.

From the experimental results shown in FIG. 4, it is learned that:
(a) The brine concentration (concentration property) is not dependent upon the membrane thickness; and
(b) The brine concentration improves if the unstretched porous sheet is used as the base sheet as in Example 6.

The brine concentration obtained by the electric dialysis is determined chiefly by the amount of the hydrolyzed water (usually called electroosmosis water and of which the brine concentration decreases if the electroosmosis water increases) that migrates accompanying the ions that permeate through the membrane and upon the selective permeability of ions through the membrane. These properties are not dependent upon the thickness of the membrane but are greatly affected by the membrane structure. Namely, in the pressure differential drive system such as filtration through membrane, the thickness of the membrane strongly affects the permeation of matter through the membrane (permeation flux due to diffusion). In the electric dialysis, on the other hand, the potential difference serves as a driving force. Therefore, the amount of ions permeating through the membrane is dependent upon the quantity of electricity but is not much dependent upon the thickness of the membrane.

The invention claimed is:

1. An ion-exchange membrane including a porous unstretched polyethylene sheet that has a thickness of 50 to 250 µm and a porosity of 30 to 80% and in which fine pores are piercing, said pores being filled with an ion-exchange resin.

2. The ion-exchange membrane according to claim 1, wherein said porous unstretched polyethylene sheet has tensile elongations of not less than 450% in both the lengthwise direction (MD) and the axial direction (TD).

3. The ion-exchange membrane according to claim 1, wherein said ion-exchange resin is obtained by filling said pores with a polymerizable composition for forming the ion-exchange resin followed by the polymerization of said polymerizable composition.

* * * * *